Aug. 18, 1959     H. C. HADLEY     2,899,794
CORN PICKER GATHERING CHAINS
Filed Sept. 11, 1956
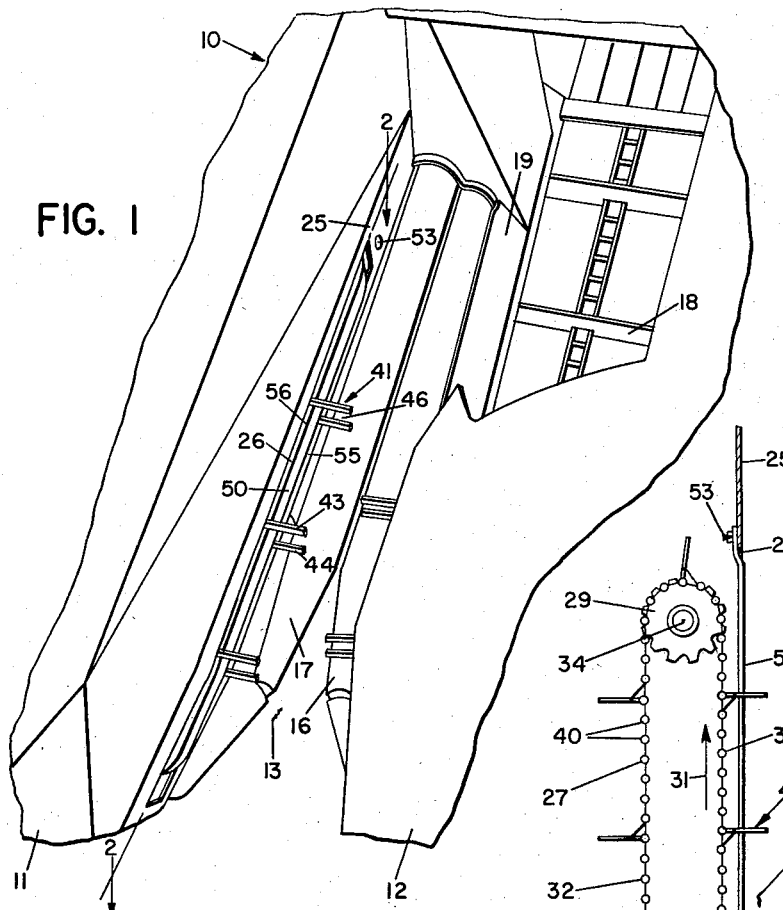
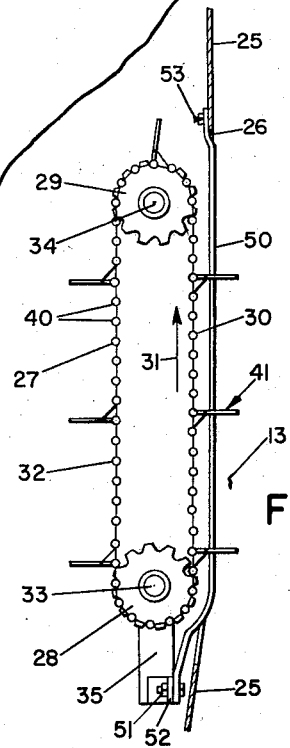
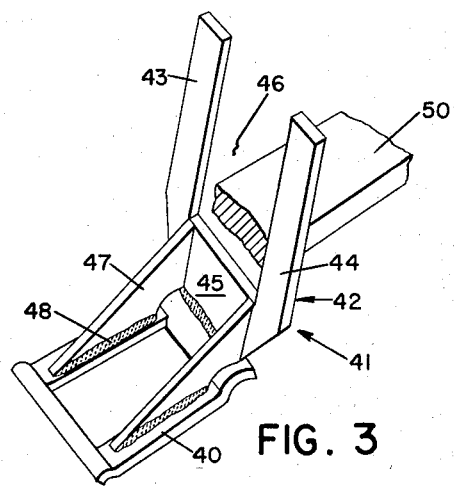
*INVENTOR.*
HOWARD C. HADLEY
ATTORNEYS United States Patent Office 2,899,794
Patented Aug. 18, 1959

2,899,794

CORN PICKER GATHERING CHAINS

Howard C. Hadley Des Moines, Iowa, assignor, by mesne assignments, to Deere & Company, a corporation of Delaware Application September 11, 1956, Serial No. 609,198

2 Claims. (Cl. 56—111)

This invention relates to a corn harvester and more particularly to the type of corn harvester which incorporates the use of gathering chains for moving ears of corn and stalks rearwardly into the harvesting mechanism. Still more particularly this invention relates to a type of gathering chain and its associated shielding.

One of the more conventional type of corn harvester presently manufactured incorporates the use of housing structure providing a fore-and-aft extending passage for receiving corn stalks into the harvester. The harvesting mechanism comprises basically a pair of cooperating snapping rolls which draw the corn stalks downwardly to detach or snap the ears from the stalks upon their engaging the rolls. Also provided is a pair of gathering chains positioned on opposite sides of the passage and having fore-and-aft extending runs on opposite sides of the passage engaging the stalks and the severed ears and moving them rearwardly.

In this type of corn harvester there is normally provided a slot or opening in the portion of the housing structure adjacent to the passage for permitting the chains and their associated lugs to be positioned in the passageway. Due to the type of chain used and required this slot opening is normally of considerable height thus providing an opening in which the ears of corn may be wedged or in many instances even pass through. Wedging of the ears in the slots with the associated proximity of the moving chain often results in a considerable amount of shelling of corn from the ear. If the ear passes through the opening it will gravitate to the earth and will be lost unless other provision is made to pick up loose ears on the ground.

It is the main object of the present invention to provide a means for eliminating the requirement of a slot or opening for the gathering chain of such height to permit ears of corn to wedge or pass through it.

It is a further object of this invention to eliminate the requirement of a substantially wide or high slot by providing a gathering chain having U-shaped lugs with the legs of the U extending into the stalk passage through a pair of relatively narrow slots, both of which will not permit entering or wedging of the ears of corn.

It is a further object of the invention to provide a combination of gathering chain and housing structure adjacent to the stalk passage which will permit only the lugs of the chain to enter the stalk passage while the linkage of the chain is positioned inwardly of the housing structure.

Other objects and advantages of the invention will become apparent to those skilled in the art as the nature of the invention is better understood from the following description as illustrated in the accompanying drawings.

Fig. 1 is a front perspective of a portion of a corn harvester which incorporates the combination of housing structure and gathering chain used in the present invention.

Fig. 2 is a sectional view of the gathering chain to the right of the stalk passage and a portion of the housing as taken along the lines 2—2 of Fig. 1.

Fig. 3 is an enlarged perspective view with parts shown in section of a chain link and lug and a portion of the shielding proximate to the lug.

The corn picker as shown partially in Fig. 1 is of a conventional design, not unlike in detail to that shown and described in U.S. Patent 2,622,382, issued to W. E. Slavens, December 23, 1952. The corn picker has a housing structure indicated in its entirety by the reference numeral 10, having a pair of forwardly extending points, not shown in full but indicated as to locality by reference numerals 11 and 12, which is spaced apart laterally and form the forward portion of the stalk passage as indicated by the arrow 13. The harvester is provided with mobile framework, also not shown, which moves the harvester forwardly over a field of row-planted corn so as to permit the stalks to enter the passage 13 from the front end. Positioned in the stalk passage 13 is a pair of cooperating snapping rolls 16 and 17 which rotate in opposite directions so as to cause their adjacent portions to move in a downward direction, the purpose being to engage the stalks in the passageway 13 and to drive them downwardly and under the harvester as it moves forwardly so as to break or snap the ears from the stalks as they come into contact with the rolls. The rear end of the snapping roll 17 is positioned above the rear end of the snapping roll 16 to initiate movement of the ears outwardly at that end of the rolls. Positioned laterally outward of the snapping rolls is a flight type conveyor 18 which receives the ears moving laterally from the rear portions of the snapping rolls 16 and 17 and operates to move the ears rearwardly to a husking unit. A panel 19 aids in conveying the ears from the snapping rolls 16 and 17 to the lower end of the flight conveyor 18. All of the above is more or less conventional in many of the present day commercial corn pickers, its importance to the present invention being only for orientation purposes. The operation and details of the harvesting unit have been obviously omitted, a more complete description being available in the aforesaid Slavens patent.

On the right side of the passage 13, as viewed from the rear of the implement, the housing structure 10 has a substantially upright panel 25 bordering the passage above the right snapping roll 17. Provided in the panel 25 is an elongated and longitudinally extending slot 26. Positioned inwardly of the slot 26 and under the housing structure 10 is a gathering chain 27 mounted over a forward sprocket 28 and a rear sprocket 29 and having a fore-and-aft extending run 30 adjacent to the passage 13 moving from front to rear as indicated by the arrow 31, and a fore-and-aft extending run 32 moving in the opposite direction. The sprockets 28 and 29 are mounted on a forward shaft 33 and a rear shaft 34, the latter shaft being driven by drive means provided in the corn harvester and in a manner similar to that set forth in the aforesaid Slavens patent. The shaft 33 is supported on supporting structure 35 provided at the forward end of the housing structure 10.

The chain 27 is composed of a plurality of links 40 which are also of a conventional design and of a type widely used on farm implements. Generally speaking there is a pivotal connection between each link 40, thereby making the chain both flexible and operative over the chain sprockets 28 and 29. Spaced along the links 40 are chain lugs 41 which project outwardly from the links. The lug 41 itself is composed of substantially a U-shaped rigid member 42 having leg or fingered portions 43 and 44 extending outwardly and a bight portion 45 rigidly connected at its inner end to the chain link 40. As may be seen in Fig. 1 the legs 43 and 44 lie adjacent to the upper and lower edges of the elongated slot 26 leaving a substantially large opening or spaced slot 46 between the legs 43 and 44. The lug 41 also has re-enforcing structure 47 extending from the forward surface of the U-shaped member 42 to the top of the link 40. The lug 41 is rigidly fixed to the link 40 by means of welding as at 48.

An elongated member or bar 50 is provided as a cover piece for the elongated slot 26. The bar 50 is substantially the width of the opening 46 of the lugs and is positioned between the legs 43 and 44 of the U-shaped lugs. The bar 50 extends substantially the length of the slot 26 and is bolted, as at 51, to an upright bracket 52 fixed to the housing structure 10. The rear end of the bar 50 is bolted as at 53 to the panel 25 of the housing structure 10. As may be seen from Fig. 1, the bar 50 forms with the lower and upper edges of the elongated slot 26 a pair of substantially parallel and relatively narrow slots 55 and 56 respectively which are of sufficient width to permit only the leg portions 43 and 44 of the lug to extend through into the passage 13.

In operation only the leg portions 43 and 44 of the entire chain 27 will contact the stalks and ears of corn as the harvester moves over the field. The slots 55 and 56, being relatively narrow, will prevent ears from entering the slots. The cover or bar 50 will prevent the ears of corn from coming into contact with the body or linkage of the chain 27. Consequently the possibility of the ears coming into contact with the chain other than the leg portions 43 and 44 has been eliminated and also the possibility of the ears being lost through the opening provided for the lugs has also been eliminated.

While details of the invention have been described in relation to the gathering chain on the right of the passage 13, provision is also made for a similar construction of the gathering chain and associated housing structure on the left of the passage 13. However, inasmuch as the principles of the invention have been clearly set forth as pertains to the structure on the right of the passage, it is felt that no further detail is necessary as to that on the left of the passage, it also being felt that the exact construction would be obvious to any one skilled in the art. Also, while the preferred embodiment of the invention provides for the bar 50 to be detachably connected to the remainder of the housing structure, the purpose being obviously to provide access to the gathering chain as well as the interior of the housing, it should be understood that the narrow upper and lower slots 55 and 56 may be provided for by other means in the housing structure. Other modifications such as more than a pair of slots with a corresponding number of fingered portions would also be an obvious variation of the present invention.

Therefore, while only one form of the invention has been shown and described, other forms and variations will unquestionably come to the minds of those skilled in the art. Therefore, it should be recognized that the present form of the invention has been described with the view of clearly and concisely illustrating its principles and it is not the desire to so limit or narrow the invention beyond that which is claimed.

What is claimed is:

1. In a corn harvester movable forwardly over a field of row planted corn, housing structure defining a fore-and-aft extending passage for successively receiving stalks of corn as the harvester moves over the field, the housing structure including vertically disposed panel means adjacent the passage having an elongated and fore-and-aft extending slot with upper and lower edges, and fore-and-aft extending harvesting mechanism in the passage adjacent to and beneath the slot effecting detachment of the ears from the stalks; a chain mounted in the housing structure having a fore-and-aft extending run proximate to the slot with rigidly connected U-shaped lugs thereon projecting through the slot and into the passage for effecting movement of the ears rearwardly as they are detached from the stalks, each of said lugs having vertically spaced upper and lower rigid portions rigidly interconnected by a vertically disposed bight portion, the upper portion moving adjacent to the upper edge of the slot and the lower portion moving adjacent to the lower edge of the slot; and an elongated housing member disposed between the upper and lower portions adjacent to and on the passage side of said bight portion for partially closing the elongated slot and preventing entry of the ears into the slot.

2. The invention defined in claim 1, in which the elongated housing member disposed between the upper and lower portions is detachably connected to the housing structure and may be removed for access to the chain and to the interior of the housing structure.

References Cited in the file of this patent

UNITED STATES PATENTS

| | | |
|---|---|---|
| 572,110 | Gray | Dec. 1, 1896 |
| 1,102,227 | Baird | July 7, 1914 |
| 1,593,501 | Martin et al. | July 20, 1926 |
| 2,542,573 | Rosenthal | Feb. 20, 1951 |
| 2,622,382 | Slavens | Dec. 23, 1952 |
| 2,735,533 | Collins et al. | Feb. 21, 1956 |
| 2,753,676 | Collins | July 10, 1956 |